United States Patent
Landa et al.

(10) Patent No.: US 7,560,403 B2
(45) Date of Patent: Jul. 14, 2009

(54) CLEAR GLASS COMPOSITION WITH ERBIUM OXIDE

(75) Inventors: Ksenia A Landa, Brownstown, MI (US); Leonid M. Landa, Brownstown, MI (US); Scott V. Thomsen, South Lyon, MI (US); Richard Hulme, Rochester Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 422 days.

(21) Appl. No.: 11/581,779

(22) Filed: Oct. 17, 2006

(65) Prior Publication Data

US 2008/0090718 A1 Apr. 17, 2008

(51) Int. Cl.
*C03C 3/095* (2006.01)
*C03C 3/087* (2006.01)

(52) U.S. Cl. .............................. 501/64; 501/70; 501/71

(58) Field of Classification Search .................... 501/64, 501/70, 71
See application file for complete search history.

(56) References Cited

U.S. PATENT DOCUMENTS

| | | | |
|---|---|---|---|
| 6,407,021 B1 | 6/2002 | Kitayama et al. | |
| 6,461,736 B1 | 10/2002 | Nagashima et al. | |
| 6,548,434 B2 | 4/2003 | Nagashima | |
| 6,573,207 B2 | 6/2003 | Landa et al. | |
| 6,610,622 B1 * | 8/2003 | Landa et al. | 501/64 |
| 6,716,780 B2 * | 4/2004 | Landa et al. | 501/64 |
| 6,927,186 B2 | 8/2005 | Hulme et al. | |
| 6,949,484 B2 * | 9/2005 | Landa et al. | 501/64 |
| 7,030,047 B2 * | 4/2006 | Landa et al. | 501/64 |
| 7,037,869 B2 * | 5/2006 | Landa et al. | 501/64 |
| 7,135,425 B2 * | 11/2006 | Thomsen et al. | 501/64 |
| 7,144,837 B2 * | 12/2006 | Landa et al. | 501/71 |
| 2003/0144126 A1 | 7/2003 | Kitayama et al. | |
| 2005/0188725 A1 | 9/2005 | Tullman et al. | |
| 2007/0161492 A1 | 7/2007 | Smith et al. | |

FOREIGN PATENT DOCUMENTS

| | | |
|---|---|---|
| JP | 07-109147 | 4/1995 |
| JP | 10-226534 | 8/1998 |
| JP | 11-060269 | 3/1999 |
| WO | WO 95/13993 | 5/1995 |
| WO | WO 01/66477 | 9/2001 |
| WO | WO 03/064342 | 8/2003 |
| WO | WO 2005/082799 | 9/2005 |

* cited by examiner

*Primary Examiner*—Karl E Group
*Assistant Examiner*—Elizabeth A Bolden
(74) *Attorney, Agent, or Firm*—Nixon & Vanderhye P.C.

(57) ABSTRACT

Glass is provided so as to have high visible transmission and/or fairly clear or neutral color. In certain example embodiments, the glass includes a low amount of iron coupled with erbium (Er, including an oxide thereof) designed to provide a neutral color and high transmittance. In certain example embodiments, the amount of $SO_3$ in the glass composition is increased in order to provide increased visible transmission, without sacrificing neutral color. The glass may optionally include a small amount of cobalt (Co, including an oxide thereof) in certain example instances.

22 Claims, 1 Drawing Sheet

| | 1 (baseline) | 2 | 3 | 4 | 5 |
|---|---|---|---|---|---|
| Composition, wt.% oxides | | | | | |
| SiO2 | 71.87 | 71.94 | 72.02 | 71.89 | 72.11 |
| Al2O3 | 0.659 | 0.592 | 0.621 | 0.608 | 0.611 |
| Fe2O3 | 0.060 | 0.060 | 0.059 | 0.059 | 0.058 |
| CaO | 9.19 | 9.05 | 9.11 | 9.12 | 9.06 |
| MgO | 4.17 | 4.15 | 4.09 | 4.21 | 4.19 |
| Na2O | 13.48 | 13.69 | 13.45 | 13.51 | 13.55 |
| K2O | 0.31 | 0.27 | 0.24 | 0.24 | 0.26 |
| SO3 | 0.224 | 0.232 | 0.208 | 0.273 | 0.301 |
| TiO2 | 0.066 | 0.058 | 0.051 | 0.049 | 0.062 |
| Er2O3 | 0 | 0.050 | 0.060 | 0.055 | 0.055 |
| Spectral properties at 6 mm | | | | | |
| %Tvis (Ill C) | 89.94 | 90.01 | 89.92 | 90.66 | 90.78 |
| D65 L* | 96.02 | 96.04 | 96.01 | 96.26 | 96.36 |
| D65 a* | -0.89 | -0.50 | -0.41 | -0.32 | -0.29 |
| D65 b* | 0.28 | 0.23 | 0.32 | 0.34 | 0.57 |
| %FeO | 0.0110 | 0.0112 | 0.0108 | 0.0083 | 0.0071 |

FIG. 1

CLEAR GLASS COMPOSITION WITH ERBIUM OXIDE

Certain example embodiments of this invention relate to a clear glass composition. In certain example embodiments of this invention, a glass having high light transmittance in the visible range and/or fairly neutral color is provided. In certain example embodiments, the glass includes a low amount of iron coupled with erbium designed to provide a neutral color and high transmittance. In certain example embodiments, the amount of $SO_3$ in the glass composition is increased in order to provide increased visible transmission, without sacrificing neutral color. Such glass compositions are thus useful, for example, in architectural windows, patterned glass applications, IG window units, shower doors, furniture glass, or the like.

BACKGROUND OF THE INVENTION

Glass that is fairly clear in color and highly transmissive to visible light (e.g., at least 75% transmissive, or even more preferably at least 80% transmissive) is sometimes desirable. One way of achieving such as glass is to use very pure base glass materials (e.g., substantially free of colorants such as iron). However, base materials with a high degree of purity are expensive and thus not always desirable and/or convenient. In other words, for example, the removal of iron from glass raw materials has certain practical and/or economical limits.

As can be appreciated from the above, glass raw materials (e.g., silica, soda ash, dolomite, and/or limestone) typically include certain impurities such as iron. The total amount of iron present is expressed herein in terms of $Fe_2O_3$ in accordance with standard practice. However, typically, not all iron is in the form of $Fe_2O_3$. Instead, iron is usually present in both the ferrous state ($Fe^{2+}$; expressed herein as FeO, even though all ferrous state iron in the glass may not be in the form of FeO) and the ferric state ($Fe^{3+}$). Iron in the ferrous state ($Fe^{2+}$; FeO) is a blue-green colorant, while iron in the ferric state ($Fe^{3+}$) is a yellow-green colorant. The blue-green colorant of ferrous iron ($Fe^{2+}$; FeO) is of particular concern when seeking to achieve a fairly clear or neutral colored glass, since as a strong colorant it introduces significant color into the glass. While iron in the ferric state ($Fe^{3+}$) is also a colorant, it is of less concern when seeking to achieve a glass fairly clear in color since iron in the ferric state tends to be weaker as a colorant than its ferrous state counterpart.

In view of the above, it is apparent that there exists a need in the art for a new glass composition which allows a glass to have fairly clear color and/or high visible transmission, without having to resort to extremely pure (i.e., free of iron) glass raw materials.

A known clear glass is set forth in column number one ("baseline") of FIG. 1. This baseline glass includes no erbium and has a visible transmission of 89.94% at a thickness of 6 mm. However, it would be desirable if the color neutrality and/or visible transmission of the baseline glass in FIG. 1 could be improved. In other words, it would be desirable if the color of the baseline glass in FIG. 1 could be more neutral (i.e., a* and/or b* closer to zero), and/or if the visible transmission of the baseline glass in FIG. 1 could be higher.

In view of the above, it will be apparent that there exists a need in the art for a clear glass composition capable of realizing a combination of high visible transmission (e.g., at least about 90%, more preferably at least about 90.4%, even more preferably at least about 90.5%, and possibly at least about 90.6%) in combination with neutral a* and b* color values so as to provide clear color to viewers and the like if desired.

SUMMARY OF EXAMPLE EMBODIMENTS OF INVENTION

In certain example embodiments of this invention, a clear glass composition is provided that is capable of realizing a combination of (a) high visible transmission ($T_{vis}$) (e.g., at least about 90%, more preferably at least about 90.4%, even more preferably at least about 90.5%, and possibly at least about 90.6%), and (b) neutral a* and b* color values so as to provide clear color to viewers and the like. Such transmission values may be achieved at, for example, a non-limiting reference glass thickness of about 6 mm. In certain example embodiments, the glass may have a transmissive a* color value of from about −0.80 to +0.8, more preferably from about −0.50 to +0.40, even more preferably from about −0.40 to +0.30, and sometimes from about −0.35 to +0.05. In certain example embodiments, the glass also can have a transmissive b* color value of from about −0.80 to +0.90, more preferably from about −0.50 to +0.70, even more preferably from about −0.30 to +0.60, and sometimes from about 0 to +0.55. These neutral a* and b* color values provide for a fairly clear glass having substantially no coloration in certain example embodiments of this invention.

In certain example embodiments of this invention, the clear glass includes a low amount of iron coupled with erbium oxide in amounts designed to provide a neutral color and high visible transmission. It has been found that the erbium oxide is used to provide for neutral color, in that it brings the a* color value of the resulting glass closer to zero. Such glasses are useful, for example, in architectural windows, patterned glass applications, IG window units, shower doors, furniture glass, or the like.

In certain example embodiments, the amount of $SO_3$ in the glass composition is increased in order to provide increased visible transmission. The $SO_3$ may be provided in the glass by introducing salt cake, $NaSO_4$, into the glass batch which ultimately results in $SO_3$ in the final glass. Surprisingly, it has been found that an increased amount of $SO_3$ in a high transmission glass including low amounts of iron and erbium oxide causes an increase in visible transmission without sacrificing neutral color. In certain example embodiments of this invention, the glass includes from about 0.25 to 0.40% $SO_3$, more preferably from about 0.26 to 0.36% $SO_3$, and most preferably from about 0.27 to 0.33% $SO_3$.

In certain example embodiments of this invention, there is provided a glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.02 to 0.10% |
| erbium oxide | 0.02 to 0.15% |
| $SO_3$ | 0.25 to 0.40% |
| cerium oxide | 0 to 0.08% | wherein the glass has visible transmission of at least 90%, a transmissive a* color value of from −0.8 to +0.8, and a transmissive b* color value of −0.8 to +0.9.

In certain other example embodiments of this invention, there is provided a glass comprising:

| Ingredient | wt. % |
| --- | --- |
| total iron (expressed as $Fe_2O_3$) | >=0.02% |
| erbium oxide | >=0.02% |
| $SO_3$ | 0.25 to 0.40% |
| cerium oxide | 0 to 0.08% | wherein the glass has visible transmission of at least 90%, a transmissive a* color value of from −0.8 to +0.8, and a transmissive b* color value of −0.8 to +0.9.

BRIEF DESCRIPTION OF THE DRAWINGS

FIG. 1 is a table comparing glass batch compositions, and characteristics of resulting glasses therefrom, of Example 2-5 of the instant invention compared to a known "baseline" glass (Example 1).

DETAILED DESCRIPTION OF CERTAIN EXAMPLE EMBODIMENTS OF THIS INVENTION

Glasses according to different embodiments of this invention may be used, for example, in architectural windows, patterned glass applications, IG window units, shower doors, furniture glass, or the like.

Certain glasses according to example embodiments of this invention utilize soda-lime-silica flat glass as their base composition/glass. In addition to the base composition/glass, a colorant portion is provided in order to achieve a glass that is clear in color and/or has a high visible transmission. An exemplary soda-lime-silica base glass according to certain embodiments of this invention, on a weight percentage basis, includes the following basic ingredients:

TABLE 1

EXAMPLE BASE GLASS

| Ingredient | Wt. % |
| --- | --- |
| $SiO_2$ | 67-75% |
| $Na_2O$ | 10-20% |
| CaO | 5-15% |
| MgO | 0-8% |
| $Al_2O_3$ | 0-5% (or 0-1%) |
| $K_2O$ | 0-5% |
| BaO | 0-1% |

Other ingredients, including various conventional refining aids, such as carbon and the like may also be included in the base glass. In certain embodiments, for example, glass herein may be made from batch raw materials silica sand, soda ash, dolomite, limestone, with the use of salt cake ($SO_3$) and/or Epsom salts as refining agents. Preferably, soda-lime-silica based glasses herein include by weight from about 10-15% $Na_2O$ and from about 6-12% CaO.

In addition to the base glass (e.g., see Table 1 above), in making glass according to certain example embodiments of the instant invention the glass batch includes materials (including colorants and/or oxidizers or the like) which cause the resulting glass to be neutral in color and/or have a high visible light transmission. These materials may either be present in the raw materials (e.g., small amounts of iron), or may be added to the base glass materials in the batch (e.g., erbium, salt cake, and/or the like). In certain example embodiments of this invention, the resulting glass has visible transmission ($T_{vis}$) of at least about 90%, more preferably at least about 90.4%, even more preferably at least about 90.5%, and possibly at least about 90.6%; such transmission values may be achieved at, for example, a non-limiting reference glass thickness of about 6 mm.

In certain embodiments of this invention, in addition to the base glass, the glass batch comprises or consists essentially of materials as set forth in Table 2 below (in terms of weight percentage of the total glass composition):

TABLE 2

EXAMPLE GLASS BATCH

| Ingredient | General (Wt. %) | More Preferred | Most Preferred |
| --- | --- | --- | --- |
| total iron (expressed as $Fe_2O_3$): | 0.02-0.10% | 0.03-0.09% | 0.05-0.065% |
| erbium oxide (e.g., $Er_2O_3$): | 0.02-0.15% | 0.02-0.08% | 0.03-0.07% |
| $SO_3$: | 0.25-0.40% | 0.26-0.36% | 0.27-0.33% |
| titanium oxide (e.g., $TiO_2$): | 0-2% | 0-1% | 0.01-0.1% |
| cerium oxide (e.g., $CeO_2$): | 0-0.08% | 0-0.05% | 0-0.03% |
| cobalt oxide (e.g., $Co_3O_4$): | 0-0.4% | 0.001-0.1% | 0.001-0.002% |
| neodymium oxide (e.g., $Nd_2O_3$): | 0-0.4% | 0.001-0.1% | 0.001-0.002% |

The batch is melted and glass formed using the known float process. Optionally, in certain example embodiments of the invention, small amounts of other materials may also be added to the batch. In certain example embodiments, the glass may be made using a batch redox of from about +7 to +14, more preferably from about +9 to +12. In certain example embodiments of this invention, the glass batch is highly oxidized so as to provide a high oxidation glass. Materials such as one or more of Epsom salt(s), sodium nitrate, gypsum, potassium nitrate, and/or the like may be used in the batch as oxidizing agents, while possibly reducing the amount of carbon input to the batch, in order to cause the batch redox to be at the desired number for oxidation purposes. The oxidized nature of the glass results in a reduced ferrous content in the final glass product.

The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{+2}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color.

The proportion of the total iron in the ferrous state (FeO) is used to determine the redox state of the glass, and redox is expressed as the ratio $FeO/Fe_2O_3$, which is the weight percentage (%) of iron in the ferrous state (FeO) divided by the weight percentage (%) of total iron (expressed as $Fe_2O_3$) in the resulting glass. In certain example embodiments of this invention, the glass may have a glass redox value (i.e., FeO/$Fe_2O_3$) of no greater than 0.20, more preferably no greater than 0.15, and most preferably no greater than 0.14 or 0.13. A lower glass redox (as opposed to batch redox) results in a lower amount of ferrous iron in the glass.

In order to compensate for the color caused by the ferric iron resulting from the optional presence of one or more oxidizers in the batch, it has been found that adding erbium oxide (e.g., $Er_2O_3$ or any other suitable stoichiometric form) in certain example instances causes the color of the resulting glass to become more clear (e.g., the erbium causes a* to move toward neutral zero). Erbium oxide acts as a pink colorant. In particular, erbium oxide apparently acts to physically compensate for the iron color, thereby making the color of the glass more neutral which is desirable in certain example embodiments of this invention, while allowing the glass to still have high visible transmission. In particular, it has been found that the use of such erbium oxide in the glass allows a high transmission and fairly neutral colored glass to be achieved without having to completely eliminate iron from the glass.

In certain example embodiments, the amount of $SO_3$ in the glass composition is increased in order to provide increased visible transmission. The $SO_3$ may be provided in the glass by introducing salt cake, $NaSO_4$, or the like into the glass batch, which ultimately results in $SO_3$ in the final glass. Surprisingly, it has been found that an increased amount of $SO_3$ in a high transmission glass including low amounts of iron and erbium oxide causes an increase in visible transmission without sacrificing neutral color. In certain example embodiments of this invention, the glass includes from about 0.25 to 0.40% $SO_3$, more preferably from about 0.26 to 0.36% $SO_3$, and most preferably from about 0.27 to 0.33% $SO_3$. In certain example embodiments of this invention, it is possible that the amount of $SO_3$ in the glass is increased as a result of oxidation in the batch process, and transmission is increased as a result of decreased FeO; it is possible to oxidize with a combination of nitrate and sulfate in certain alternative instances in which case $SO_3$ content in the glass may be less but transmission still acceptable.

According to certain example embodiments of this invention, the optional presence of a small amount of cerium oxide (e.g., $CeO_2$) as an oxidizer in the glass batch may act as a chemical decolorizer since during melting of the glass batch it causes iron in the ferrous state ($Fe^{2+}$; FeO) to oxidize to the ferric state ($Fe^{3+}$). Accordingly, a significant portion of the optional $CeO_2$ which may be added to the original glass batch prior to the melt can be transformed during the melt into $Ce_2O_3$ which may be present in the resulting glass. The aforesaid oxidation of the iron tends to reduce coloration of the glass, and does not significantly decrease visible light transmission of the resulting glass (in certain instances, this may even causes visible transmission to increase). It is noted that, like $Fe_2O_3$, the phrase "cerium oxide" as used herein refers to total cerium oxide (i.e., including cerium oxide in both the $Ce^{4+}$ and $Ce^{3+}$ states). However, generally speaking, the use of expensive cerium oxide is not desired in significant quantities due to its possible yellow coloration and its expense. Thus, the amounts of optional cerium oxide are kept very low, or at zero, in certain example embodiments of this invention.

It is noted that glass according to certain example embodiments of this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

In view of the above, glasses according to certain example embodiments of this invention achieve a neutral or clear color and/or high visible transmission. In certain embodiments, resulting glasses according to certain example embodiments of this invention may be characterized by one or more of the following transmissive optical or color characteristics when measured at a thickness of from about 1 mm-6 mm (most preferably a thickness of about 0.219 inches (5.6 or 6 mm); this is a non-limiting thickness used for purposes of reference only) (Lta is visible transmission %):

TABLE 3

CHARACTERISTICS OF CERTAIN EXAMPLE EMBODIMENTS

| Characteristic | General | More Preferred | Most Preferred |
| --- | --- | --- | --- |
| Lta (Ill. C, 2 deg.): | >=90% | >=90.4% | >=90.5 or 90.6% |
| % FeO: | <=0.015% | <=0.010% | <=0.009% (or 0.008%) |
| L* (Ill. D65, 10 deg.): | 90-100 | 95-98 | 96-97 |
| a* (Ill. D65, 10 deg.): | −0.8 to +0.8 | −0.5 to +0.4 | −0.4 to +0.3 |
| b* (Ill. D65, 10 deg.): | −0.8 to +0.9 | −0.5 to +0.7 | −0.3 to +0.6 |

As can be seen from Table 3 above, glasses of certain embodiments of this invention achieve desired features of clear color and/or high visible transmission, while not requiring iron to be eliminated from the glass composition. This may be achieved through the provision of the unique material combinations described herein.

EXAMPLES 1-5

FIG. 1 illustrates the compositions for the glasses of Examples 1-5. Examples 1-5 in FIG. 1 are provided for purposes of example only, and are not intended to be limiting. Example 1 sets forth the composition of a known glass referred to as the baseline in FIG. 1. Meanwhile, Examples 2-5 are in the four right-hand-most columns of FIG. 1 and are examples of this invention.

For Examples 2-5, melts (130 g of glass) were made in platinum crucibles at 1480 degrees C. for four hours and samples were cast into round graphite molds, annealed, cut, polished and measured; chemical analysis by XRF and glass spectra on a Lambda 900 machine. The experimental results are shown in FIG. 1. It can be seen in FIG. 1 that each of Examples 2-5 achieved a combination of high visible transmission and fairly neutral color. Moreover, it can be seen that increased amounts of $SO_3$ in these high transmission glasses including low amounts of iron and erbium oxide caused an increase in visible transmission without sacrificing neutral color. In particular, is can be seen that Examples 4 and 5 with the higher amounts of $SO_3$ also had the higher visible transmissions (compared to Examples 1-3 with lower $SO_3$ content), without sacrificing neutral color.

In certain example embodiments of this invention, the glass is substantially free of or free of one, two, three, four, five or all of selenium, nickel, arsenic, lead, cerium, and/or antimony (including oxides thereof). In certain example embodiments of this invention, glasses include from 0 to 0.01% by weight of one, two, three, four, five, or all of these elements (including oxides thereof), more preferably no more than 0.0010% of the same, and most preferably no more than 0.0007% of the same, and even more preferably no more than 0.0005% (or no more than 0.0001%) of one, two, three, four, five or all of these elements (including oxides thereof). Moreover, in certain example embodiments, the glass may optionally be substantially free of MgO; although MgO may be introduced into the batch in the form of Epsom salt rather than via dolomite in certain example instances.

Once given the above disclosure many other features, modifications and improvements will become apparent to the skilled artisan. Such features, modifications and improvements are therefore considered to be a part of this invention, the scope of which is to be determined by the following claims:

What is claimed is:

1. Glass comprising:

| Ingredient | wt. % |
| --- | --- |
| $SiO_2$ | 67-75% |
| $Na_2O$ | 10-20% |
| CaO | 5-15% |
| total iron (expressed as $Fe_2O_3$) | 0.02 to 0.10% |
| erbium oxide | 0.02 to 0.15% |
| $SO_3$ | 0.25 to 0.40% |
| cerium oxide | 0 to 0.08% | wherein the glass has visible transmission of at least 90%, a transmissive a* color value of from −0.8 to +0.8, and a transmissive b* color value of −0.8 to +0.9.

2. The glass of claim 1, wherein the glass comprises from 0-0.05% cerium oxide.

3. The glass of claim 1, wherein the glass comprises from 0-0.03% cerium oxide.

4. The glass of claim 1, wherein the glass comprises 0% cerium oxide.

5. The glass of claim 1, wherein the glass comprises:

| | |
| --- | --- |
| total iron (expressed as $Fe_2O_3$) | 0.03 to 0.09% |
| erbium oxide | 0.02 to 0.08% |
| $SO_3$ | 0.26 to 0.36% |
| cerium oxide | 0 to 0.05%. |

6. The glass of claim 1, wherein the glass comprises:

| | |
| --- | --- |
| total iron (expressed as $Fe_2O_3$) | 0.05 to 0.065% |
| erbium oxide | 0.03 to 0.07% |
| $SO_3$ | 0.27 to 0.33% |
| cerium oxide | 0 to 0.03%. |

7. The glass of claim 1, wherein the glass comprises from 0.26 to 0.36% $SO_3$.

8. The glass of claim 1, wherein the glass comprises from 0.27 to 0.33% $SO_3$.

9. The glass of claim 1, wherein the glass comprises less than or equal to 0.015% FeO.

10. The glass of claim 1, wherein the glass comprises less than or equal to 0.010% FeO.

11. The glass of claim 1, wherein the glass has visible transmission of at least 90.4%, a transmissive a* color value of from −0.5 to +0.4, and a transmissive b* color value of −0.5 to +0.7.

12. The glass of claim 1, wherein the glass has visible transmission of at least 90.5%.

13. The glass of claim 1, wherein the glass is substantially free of at least three of selenium, nickel, arsenic, lead, and antimony.

14. The glass of claim 1, wherein the glass is substantially free of each of selenium, nickel, arsenic, lead, and antimony.

15. The glass of claim 1, wherein the glass comprises from 0 to 0.4% cobalt oxide and/or neodymium oxide.

16. The glass of claim 1, wherein the glass comprises from 0.001 to 0.1% cobalt oxide and/or neodymium oxide.

17. The glass of claim 1, wherein the glass has a glass redox value ($FeO/Fe_2O_3$) of no more than 0.15.

18. Glass comprising:

| Ingredient | wt. % |
| --- | --- |
| total iron (expressed as $Fe_2O_3$) | 0.02 to 0.1% |
| erbium oxide | 0.02 to 0.15% |
| $SO_3$ | 0.25 to 0.40% |
| cerium oxide | 0 to 0.08% | wherein the glass has visible transmission of at least 90%, a transmissive a* color value of from −0.8 to +0.8, and a transmissive b* color value of −0.8 to +0.9.

19. The glass of claim 18, wherein the glass comprises from 0-0.05% cerium oxide, more preferably from 0-0.3% cerium oxide.

20. The glass of claim 18, wherein the glass comprises:

| | |
| --- | --- |
| total iron (expressed as $Fe_2O_3$) | 0.03 to 0.09% |
| erbium oxide | 0.02 to 0.08% |
| $SO_3$ | 0.26 to 0.36% |
| cerium oxide | 0 to 0.05%. |

21. The glass of claim 18, wherein the glass comprises from 0.26 to 0.36% $SO_3$, more preferably from 0.27 to 0.33% $SO_3$.

22. The glass of claim 18, wherein the glass is substantially free of each of selenium, nickel, arsenic, lead, and antimony.

* * * * *